US006820859B2

(12) United States Patent
Miyazoe et al.

(10) Patent No.: US 6,820,859 B2
(45) Date of Patent: Nov. 23, 2004

(54) BODY FOR VALVE AND METHOD FOR MANUFACTURING THE SAME

(75) Inventors: Shinji Miyazoe, Tsukuba-gun (JP); Masaru Narita, Tsukuba-gun (JP); Makoto Ishikawa, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 183 days.

(21) Appl. No.: 10/218,443

(22) Filed: Aug. 15, 2002

(65) Prior Publication Data

US 2003/0042460 A1 Mar. 6, 2003

(30) Foreign Application Priority Data

Aug. 28, 2001 (JP) ........................................ 2001-258328

(51) Int. Cl.⁷ ................................................ F16K 3/24
(52) U.S. Cl. ..................... 251/367; 251/30.01
(58) Field of Search ................ 251/367, 366, 251/30.01

(56) References Cited

U.S. PATENT DOCUMENTS

| | | | | |
|---|---|---|---|---|
| 1,787,628 A | * | 1/1931 | Jones | .......................... 251/367 |
| 2,295,111 A | * | 9/1942 | John | ...................... 29/890.125 |
| 3,504,704 A | * | 4/1970 | Beckett et al. | ......... 137/625.64 |
| 3,899,377 A | | 8/1975 | Luc | |
| 5,235,746 A | | 8/1993 | Leonard | |
| 5,361,803 A | * | 11/1994 | Stoll | ...................... 137/625.66 |
| 5,487,409 A | | 1/1996 | Stoll et al. | |
| 6,015,133 A | * | 1/2000 | DeLand | ................... 251/30.01 |

FOREIGN PATENT DOCUMENTS

| | | |
|---|---|---|
| DE | 2 046 980 | 3/1972 |
| DE | 94 07 083 | 8/1994 |
| EP | 0 787 557 | 8/1997 |
| GB | 822 366 | 10/1959 |

\* cited by examiner

Primary Examiner—J. Casimer Jacyna
(74) Attorney, Agent, or Firm—Oblon, Spivak, McClelland, Maier & Neustadt, P.C.

(57) ABSTRACT

To simplify and facilitate working/grinding or the like on a valve hole in a body for a valve reduce a manufacturing cost of the body for a valve. A body for a valve 10 provided with a valve hole for inserting a valve member slidably therein is formed by splitting the body for a valve on split faces 13 including an axial line of the valve hole and extending along directions of flow paths 12p, 12a, 12b, 12r communicating towards the valve hole from ports P, A, B, R opened to a body outer face and mutually joining body portion pieces which are respectively molded individually.

12 Claims, 10 Drawing Sheets

[Fig. 5]
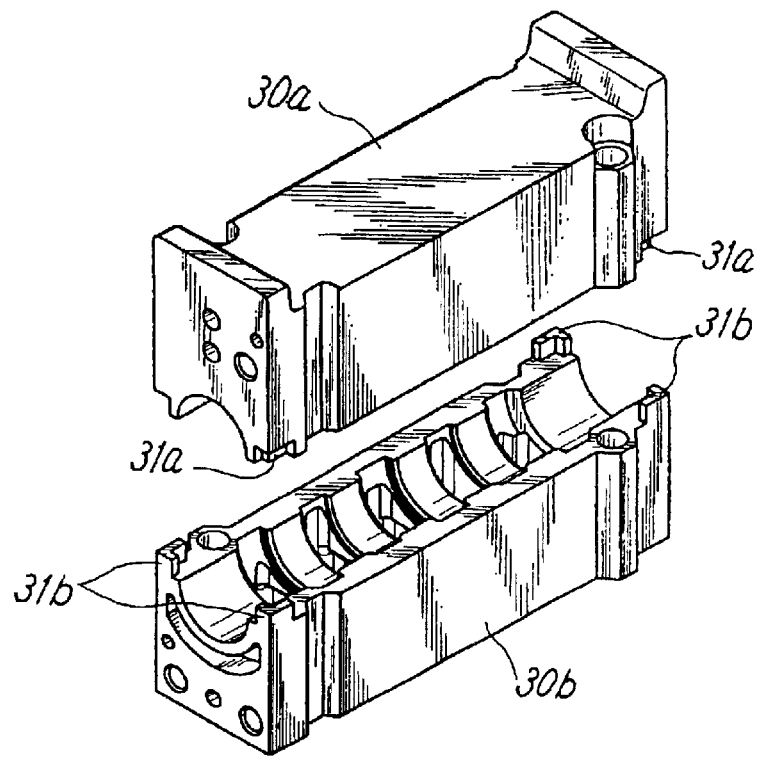
[Fig. 7]
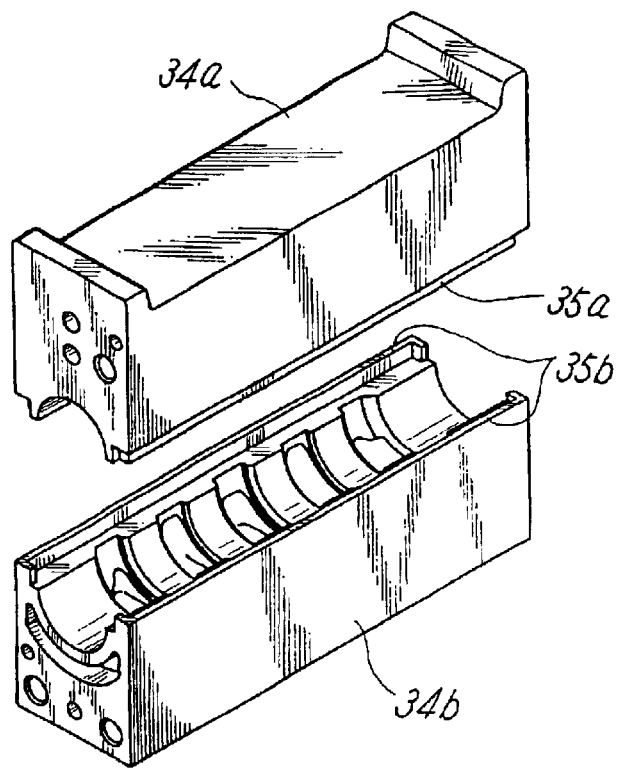

[Fig. 8]
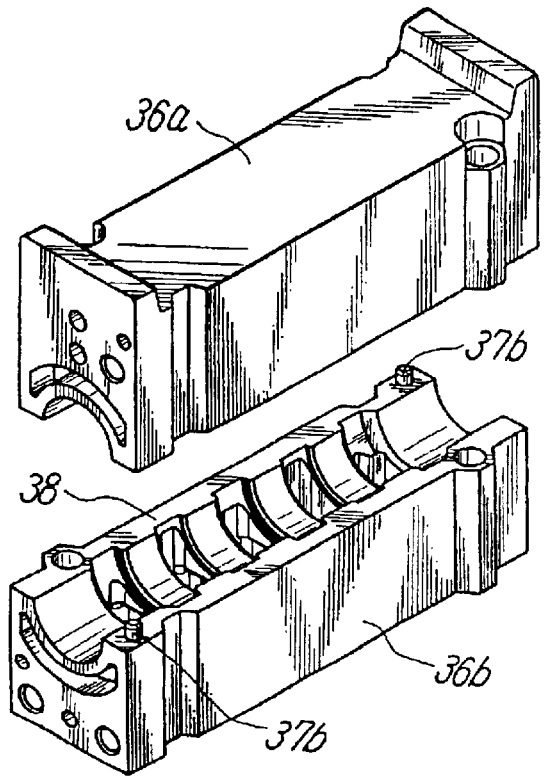
[Fig. 6]
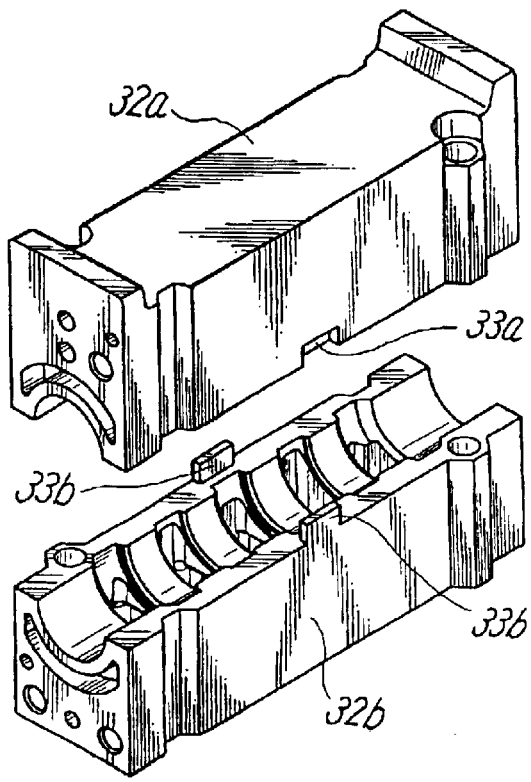

[Fig. 9]
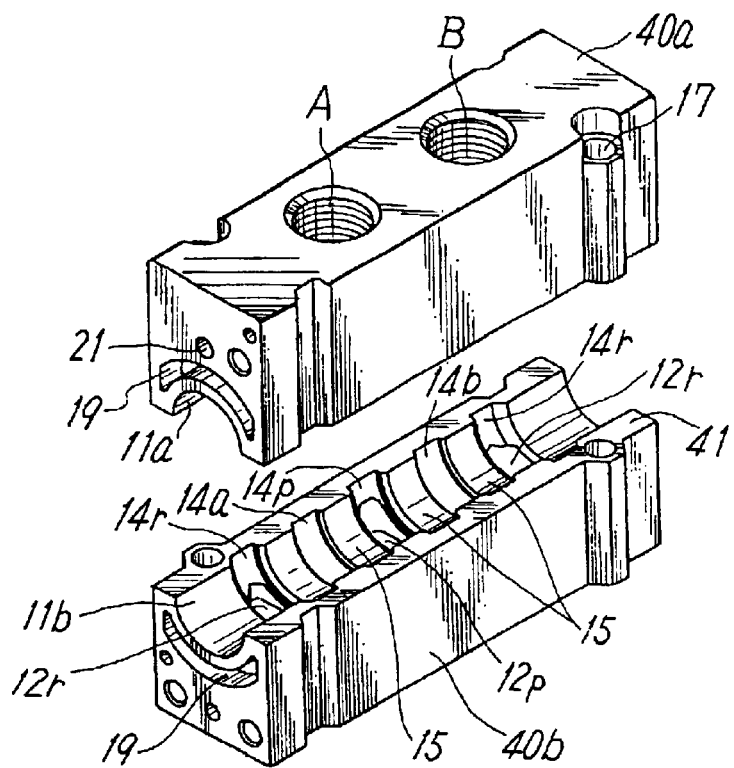
[Fig. 10]
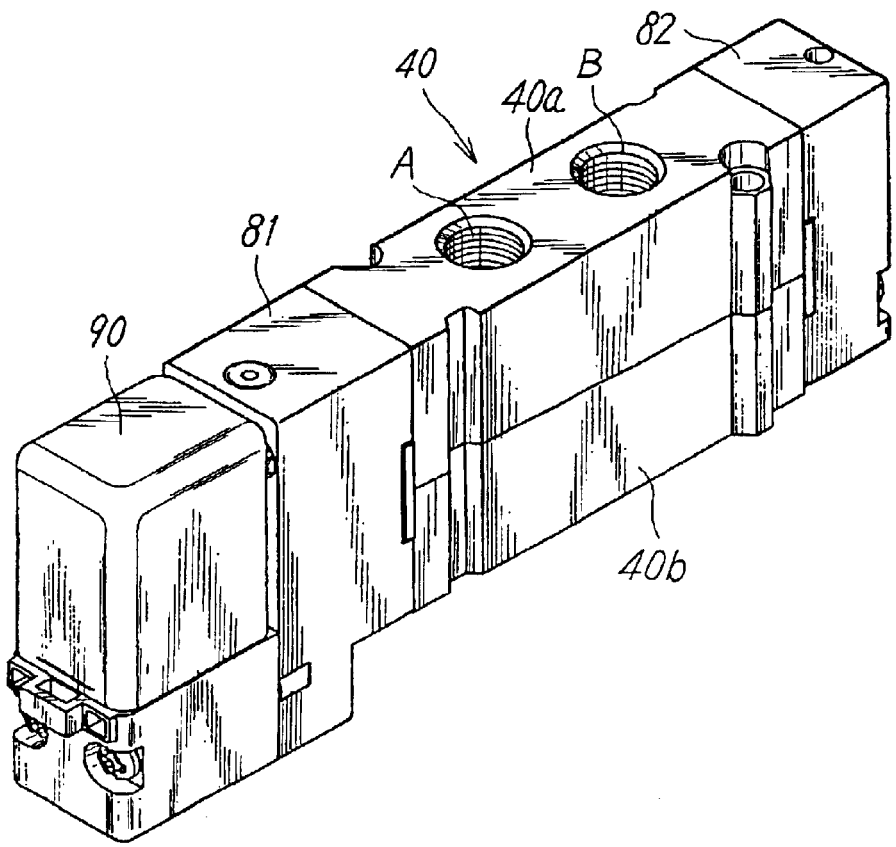

[Fig. 11]
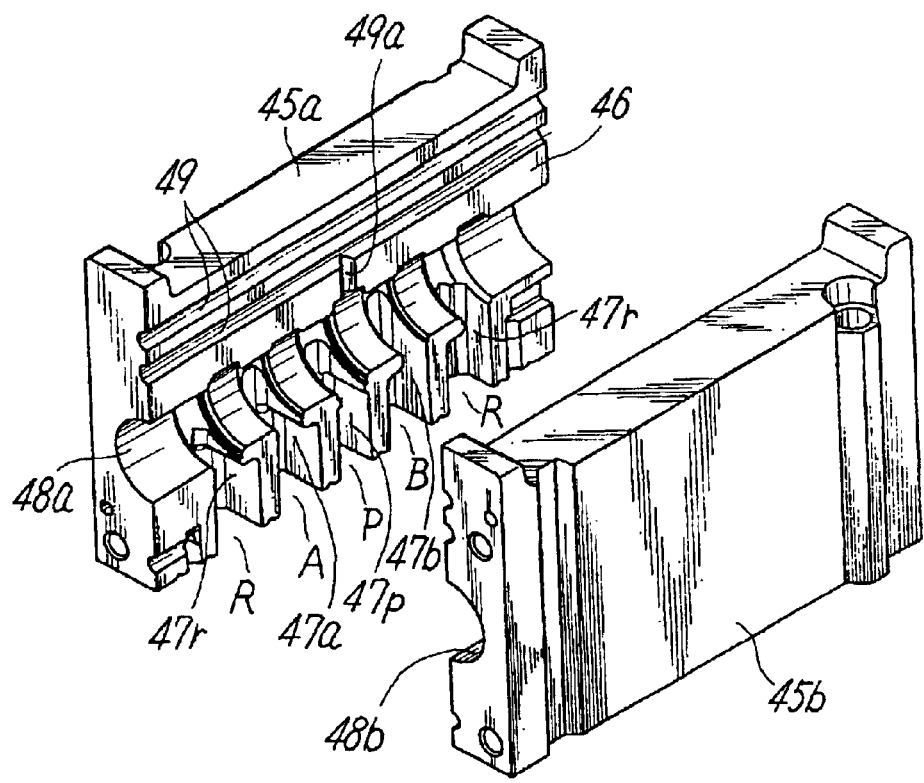
[Fig. 12]
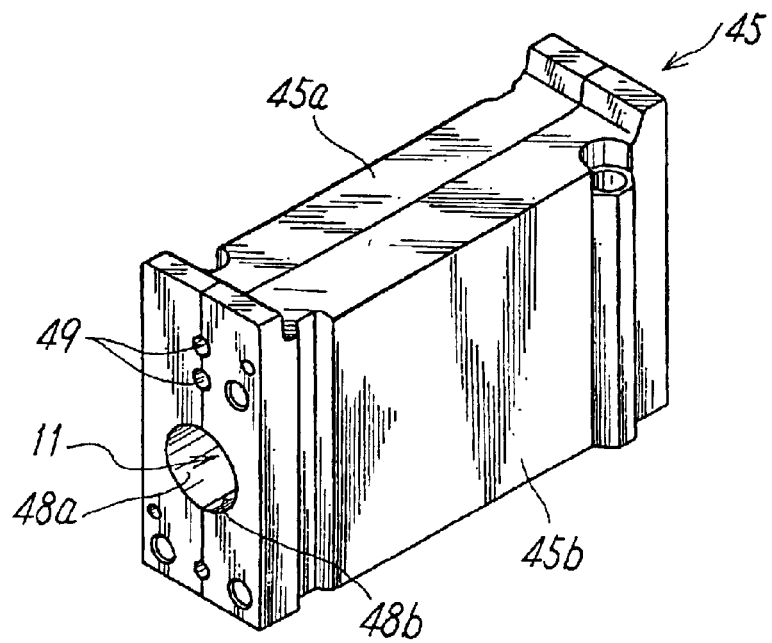

[Fig. 17]
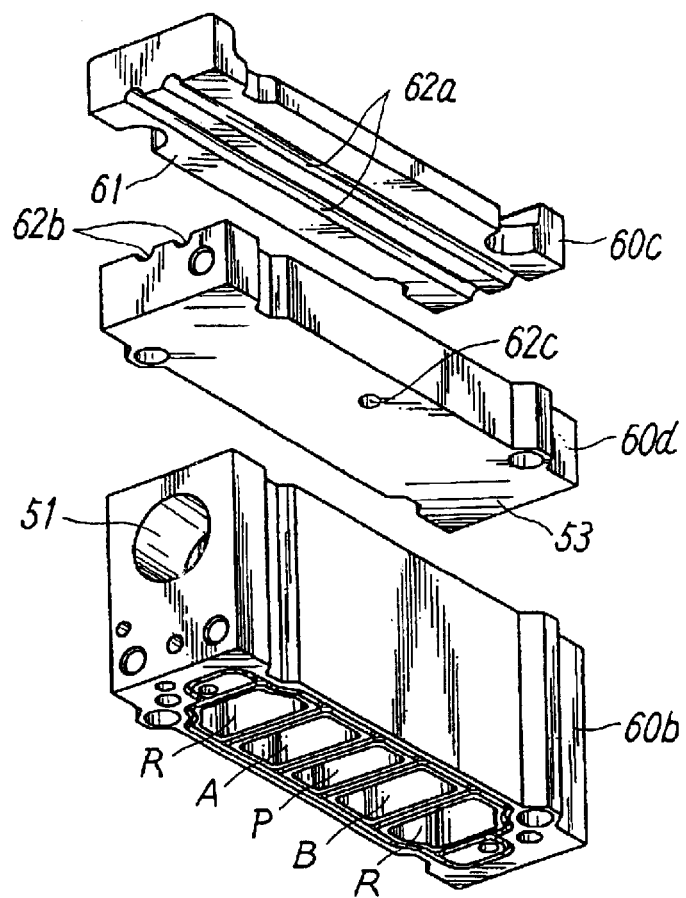
[Fig. 15]
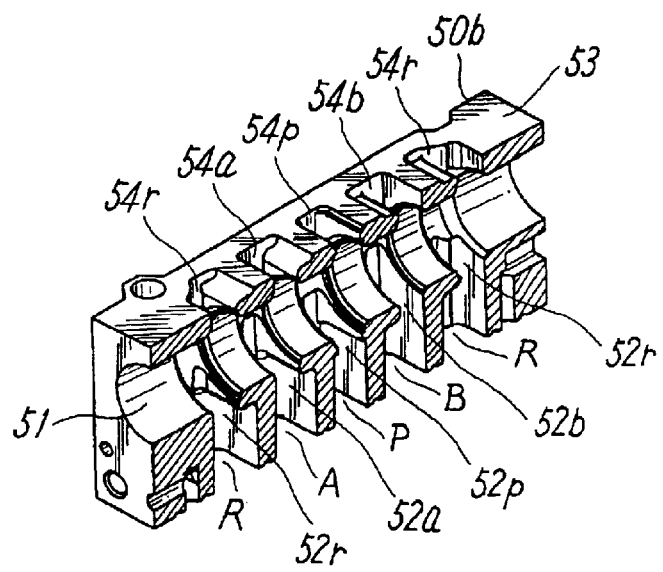

BODY FOR VALVE AND METHOD FOR MANUFACTURING THE SAME

TECHNICAL FIELD

The present invention relates a body for a valve and a method for manufacturing the same.

PRIOR ART

Conventionally, a body for a valve provided therein with a valve hole for inserting a valve member therein slidably can be obtained by molding rough material for a body formed with a rough hole to be finished as the valve hole, flow path holes reaching the valve hole from ports opened to an outer face of the body and the like in advance and performing working/grinding on a seat portion coming in contact with a valve member in the rough hole, expansion flow paths for expanding respective flow paths at positions communicating with the valve hole and the like by tools inserted from one end of the rough hole.

However, since such working/grinding must be performed by inserting tools from one end of the rough hole, as described above, there is a problem that there are relatively many constraints other than the shapes of the tools and shapes to be obtained by workings, which results in a difficult work, prolongation of a working time and the like.

DISCLOSURE OF THE INVENTION

A technical problem of the present invention is to simplify and facilitate working/grinding or the like in a valve hole in the above-described body for a valve, particularly working of a recess in the valve hole, thereby reducing a manufacturing cost of the body for a valve.

Another technical problem of the present invention is to increase the number of moldings effected by a single mold in a time of a die cast molding by simplifying the shape of a body for a valve, thereby increasing productivity at this point.

A first body for a valve of the present invention for solving the above problem is a body for a valve provided with a valve hole for inserting a valve member silidably, characterized in that the body is formed by splitting the body on splitting faces including an axial line of the valve hole and mutually joining body portion pieces which are respectively molded individually.

The splitting face of the body for a valve can be a face perpendicular to a direction of a flow path communicating towards the valve hole from a port opened to a body outer face, or it can be a face extending along a direction of a flow path communicating towards the valve hole from a port opened to the body outer face.

A second body for a valve of the present invention is characterized in that the body is formed by splitting the body into a plurality of body portion pieces on splitting faces provided at a position opposed to a body outer face to which a port is opened via the valve hole in parallel with the body outer face and mutually joining the body portion pieces which are respectively molded individually; and the body portion piece having the valve hole has a hole for molding which is opened at a position opposed to a flow path communicating towards the port from the side of the splitting face.

On the other hand, a manufacturing method of the present invention for manufacturing the above-described body for a valve is characterized by comprising the steps of: preliminarily molding respective body portion pieces; after preheating splitting faces of the body portion pieces and wetting them with solder, bringing in close contact with both the splitting faces; and after heating and joining both the splitting faces by friction of the both splitting faces or irradiation of ultrasonic wave, cooling the joined portions to the splitting faces to integrate the body portion pieces.

According to the body for a valve having the above-described constitution and the manufacturing method, since the body is formed by splitting the body in pieces having a shape which facilitates molding of a recess on an inner face of the valve hole or the like, which is performed by die casting, namely, by splitting the body on a splitting face which includes an axial line of the valve hole and which is perpendicular to a direction of a flow path communicating towards the valve hole from the port opened to a body outer face or which extends along a direction of the flow path, or by splitting the body on a splitting face parallel with a face of a body outer face to which a port is opened on a side opposed to the face via the valve hole, and molding split body portion pieces individually, it is unnecessary to insert a tool from one end of a rough hole to perform cutting or the like, as described above, or even if the cutting is performed partially, such a cutting is made very simple and easy. Eventually, a manufacturing cost of the body for a valve can be reduced.

Also, as described above, since a body for a valve is split into a plurality of body portion pieces whose shapes are simplified and molding effected by die casting is facilitated owing to simplification of these shapes, the number of moldings conducted by a single molding die is increased, and productivity is enhanced regarding this point, so that a manufacturing cost of the body for a valve can be reduced. In addition, since, during molding respective body portion pieces, lightening for an unnecessary portion can be performed on splitting faces of the body portion pieces, material can be saved.

Since the split body portion pieces can easily be joined in an air-tight manner by frictional soldering, ultrasonic soldering or the like, as described above, the manufacturing cost can be reduced as compared with the conventional example even when such a step is added.

Incidentally, even when the above-described body for a valve is split and split valve pieces are then joined to one another, working in the valve hole to be performed after joined is not completely removed necessarily. For example, such a working that solder flowed out is removed, a seat portion (a valve seat portion) coming in contact with a seal member is polished and so on must be performed. However, the working is made extremely simple as compared with that in the conventional example.

Here, also, explanation about the case that the body for a valve is split at a face including the axial line of the valve hole or at both sides of the valve hole has been made. However, in order to facilitate molding of the body portion pieces, such a constitution can, of course, be employed that the body are split at an appropriate portion other than the above and molded, as needs, and the split body portion pieces are joined.

BRIEF DESCRIPTION OF THE INVENTION

FIG. 5 is an exploded perspective view showing a modified embodiment of the above-described first embodiment according to the present invention.

FIG. 6 is an exploded perspective view showing another modified embodiment of the above-described first embodiment according to the present invention.

FIG. 7 is an exploded perspective view showing still another modified embodiment of the above-described first embodiment according to the present invention.

FIG. 8 is an exploded perspective view showing still another modified embodiment of the first embodiment according to the present invention.

FIG. 9 is an exploded perspective view showing a second embodiment of a body for a valve according to the present invention.

FIG. 10 is an appearance perspective view of an electromagnetic valve assembled using the body for a valve of the second embodiment.

FIG. 11 is an exploded perspective view of a third embodiment of a body for a valve according to the present invention.

FIG. 12 is an appearance perspective view showing a joined state of a pair of body portion pieces in the third embodiment.

FIG. 15 is a perspective view showing a body portion piece in the fourth embodiment in an exploded manner.

FIG. 17 is an exploded perspective view viewed from another direction of the above-described modified embodiment.

DETAILED DESCRIPTION

From FIG. 1 to FIG. 4 show a first embodiment of a body for a valve according to the present invention.

Figure 4:
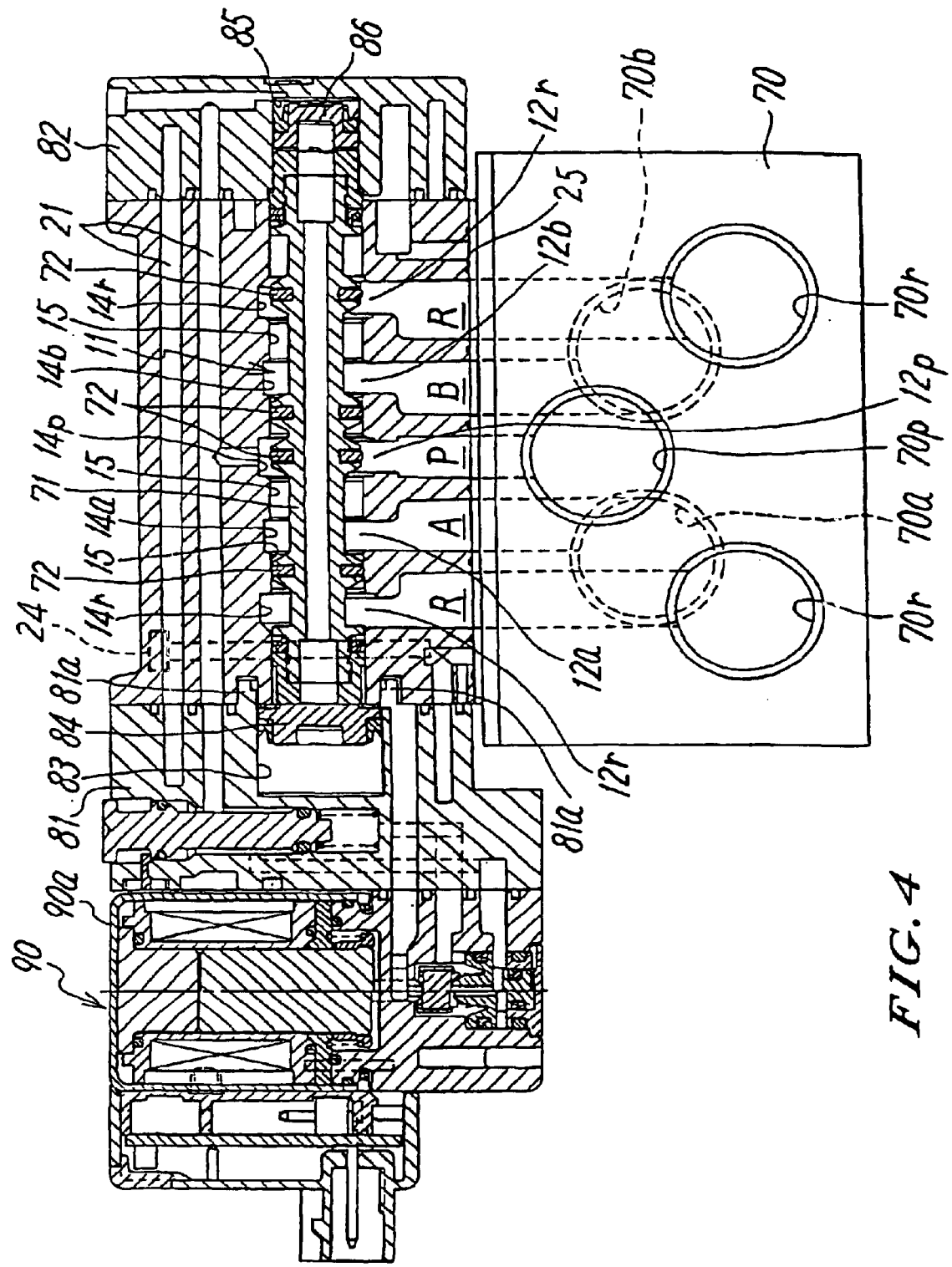
FIG. 4 is a sectional view of the electromagnetic valve assembled using the body for a valve of the above-described first embodiment.

The body for a valve 10 is constituted by joining two body portion pieces 10a, 10b. Briefly speaking, the body for a valve 10 constituted by joining these portion pieces is provided with a valve hole 11 for inserting a valve member 71 such as shown in FIG. 4, a supply port P opened to a body outer face, output ports A, B, flow paths 12p, 12a, 12b, 12r communicating from a pair of discharge ports R towards the valve hole 11 and the like.

The above-described body portion pieces 10a, 10b are formed by splitting the body for a valve 10 at one splitting face 13. The splitting face 13 includes an axial line of the valve hole 11 and it is a face perpendicular to directions of the flow paths 12p, 12a, 12b, 12r communicating towards the valve hole 11 from respective ports P, A, B, R opened to a body outer face or mounting face 25. Then, the respective body portion pieces 10a, 10b split through the splitting face are formed individually by die cast molding of aluminum base material, respectively. The splitting face 13 should be set such that molding of the respective split body portion pieces 10a, 10b effected by die cast is facilitated, On the contrary, it is desired to consider that shapes of the body portion pieces facilitate molding effected by die cast.

The constitutions of the respective body portion pieces 10a, 10b will be explained further specifically. The body portion pieces 10a, 10b are provided on their splitting faces 13 with half holes 11a, 11b constituting the valve hole 11, and the lower body portion piece 10b is further provided with flow paths 12p, 12a, 12b, 12r which cause the half hole 11b and the respective ports P, A, B, R to communicate with each other. Also, expansion flow path portions 14p, 14a, 14b, 14r for expanding the respective flow paths are provided on inner faces of the half holes 11a, 11b at positions to which the flow paths 12p, 12a, 12b, 12r are opened, and seat portions 15 coming in contact with seal members 72 for a valve member 71, riding portions 16 where a corner portion is removed such that the seal member 72 rides on the seat member 15 smoothly, and the like are provided on the inner faces.

Also, insertion holes 17 for a bolt 24 for mounting the mounting face 25 to a manifold base 70 (FIG. 4) is provided in the both body portion pieces 10a, 10b on projection portions or protrusion portions 20 of an outer face thereof, and recess grooves 18 in which the projection portion 20 in which the insertion hole 17 is provided is inserted are provided therein. Further, recessed portions 19 in which projection portions 81a for positioning of an end member 81 are fitted when the end member 81 is caused to abut on the both portion pieces 10a, 10b are provided in end faces of the both portion pieces 10a, 10b. These portions along with respective portions in the half holes 11a, 11b, the flow paths and the like are molded by die-casting.

Further, as clearly shown in FIG. 4, a plurality of pilot flow paths 21 are provided in the upper body portion piece 10a. In case of the illustrated embodiment, the upper side pilot flow path is utilized in case of a single pilot valve where one pilot valve 90 is mainly mounted to one end side of the body 10, while the lower side pilot flow path is utilized in case of a double pilot valve where two pilot valves 90 are mounted mainly to both sides of the body 10. This point is common in respective embodiment described below.

Incidentally, the upper body portion piece 10a is provided with the pilot flow paths 21 for allowing flow of pilot fluid and the like, and, among flow paths including these flow paths and the like, ones which can easily be worked after molding, such as simple round holes may be formed by machining effected after molding. Incidentally, ones which can easily be applied with a die cast molding can be molded simultaneously with molding a body portion piece. Also, in order to allow utilization of the body for a valve 10 to various types of electromagnetic valves, pilot flow paths which can be utilized in various electromagnetic valves and the like can be provided in a spare manner besides the above-described pilot flow paths 21.

By joining a pair of body portion pieces 10a, 10b having the above-described constitutions by the both splitting faces 13, the body for a valve 10 is formed. It is desirable to use the following solder joining process for joining the body portion pieces 10a, 10b.

Incidentally, here, as an assumption that molding of the body portion pieces 10a, 10b is performed using aluminum base material, the solder joint of these members will be explained. However, adhesive may be used for joining these members, where, when the body portion pieces 10a, 10b are molded from synthetic resin and so on, adhesive suitable to these members can be used.

Next, the process for solder joining will be explained more specifically.

In solder joining, when it is necessary to obtain the degrees of flatness of the splitting faces 13 of the body portion pieces 10a, 10b molded preliminarily, these splitting faces 13 are ground in advance. In solder joining of the body portion pieces 10a, 10b, first, the splitting faces 13 are preheated to a required temperature, for example, a temperature ranging from about 200° C. to about 250° C., and the preheated splitting faces 13 are wetted with solder. At this time, the faces are wetted with solder while oxide films on the surfaces is being removed using a wire brush or the like as needs, or the splitting faces 13 are dipped in a solder bath and ultrasonic wave is applied to these splitting faces 13. When the ultrasonic wave is used, removal of oxide films or prevention of re-oxidation can be achieved by action of the ultrasonic wave, and it is unnecessary to use flux because the splitting faces 13 are wetted with solder rapidly.

Next, the splitting face 13 is heated up to the melting temperature of the solder as needs again, the both splitting faces 13, 13 are brought in close contact with each other in the molten state of the solder, and after the splitting faces are heated and joined by friction of the both splitting faces or irradiation of ultrasonic wave, the joined portions are cooled to join the body portion pieces 10a, 10b integrally, thereby obtaining the body for a valve 10. As the solder (soft solder), Sn—Pb base solder or Sn—Zn base solder is used.

Working such as, for example, removing solder flowed out, polishing the seat portion 15 coming in contact with the seal member 72 or a the riding portion 16 of the seal member 72 is performed on an inner face of the valve hole 11 of the body for a valve 10 thus constituted as needs, but such working can be extremely simplified as compared with the conventional example.

Figure 1:
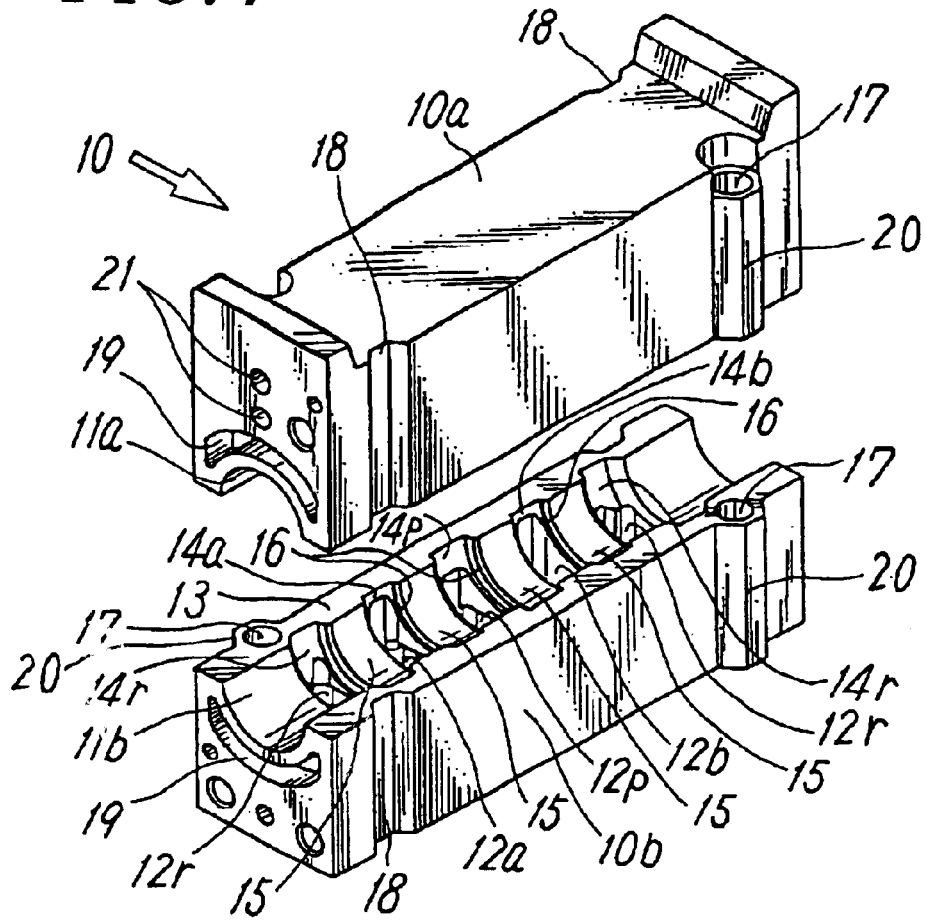
FIG. 1 is an exploded perspective view of a first embodiment of a body for a valve according to the present invention.
Figure 2:
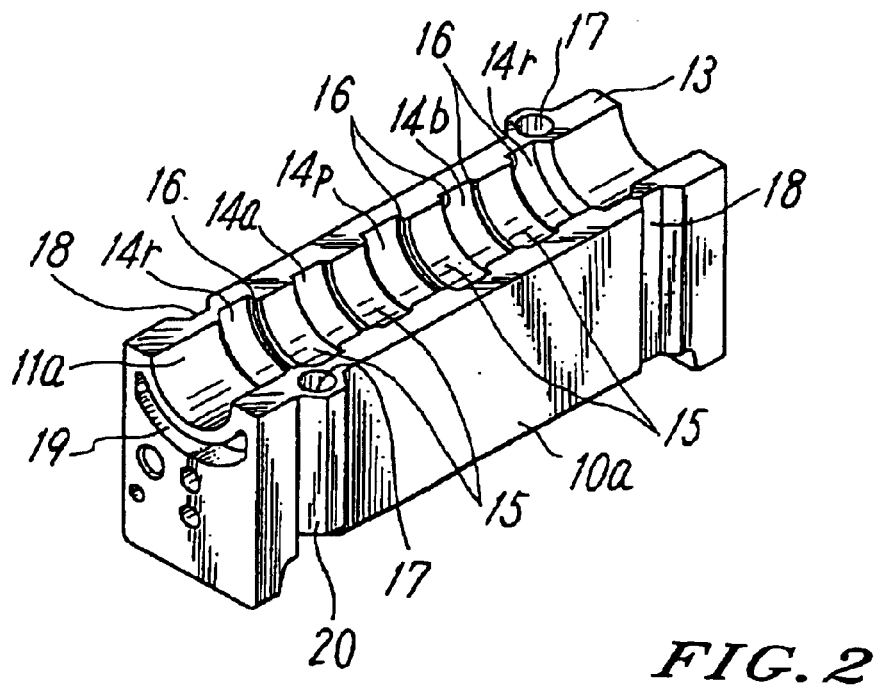
FIG. 2 is a perspective view showing a shape of a valve hole of an upper body portion piece in the above-described first embodiment.
Figure 3:
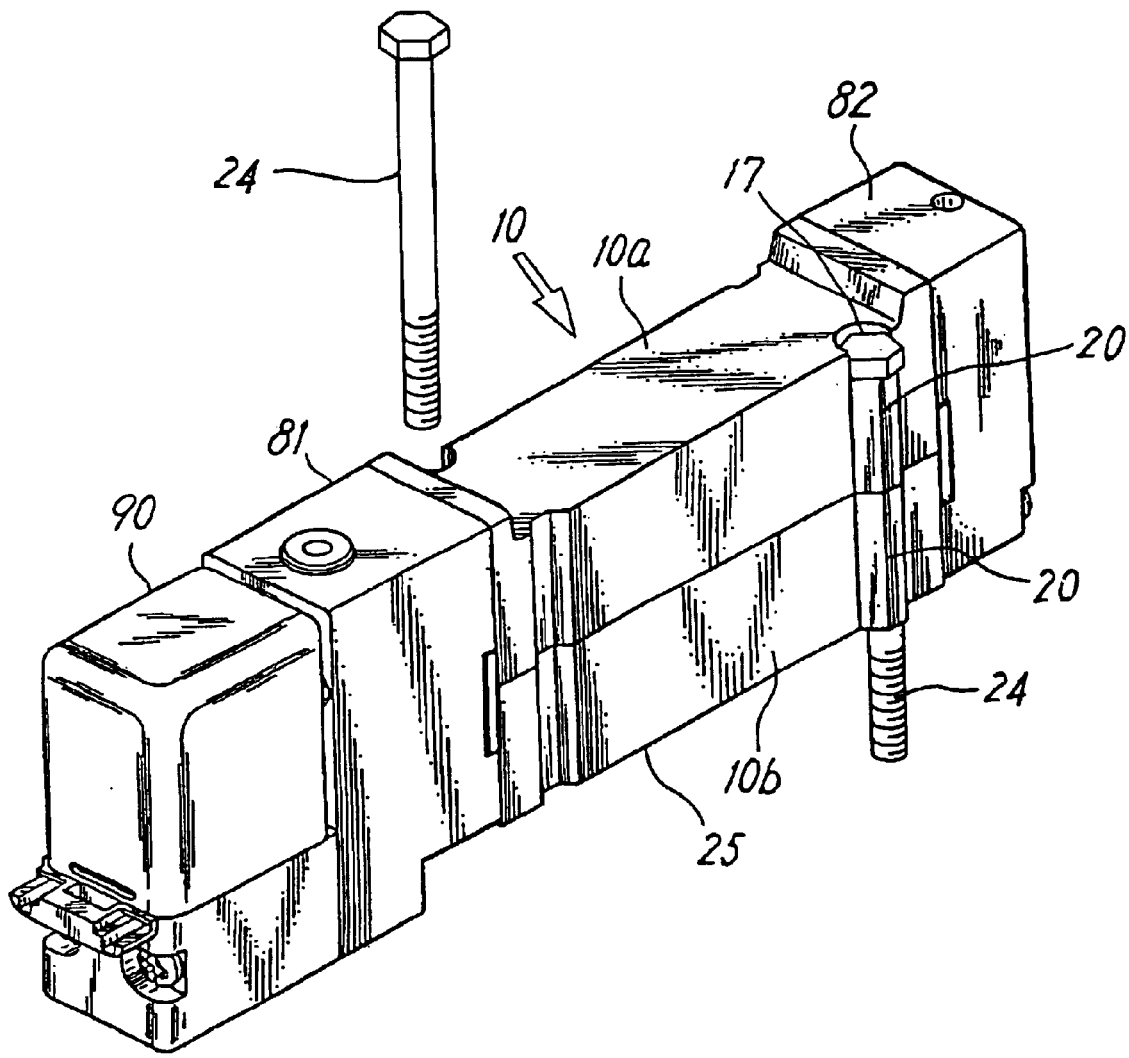
FIG. 3 is an appearance perspective view of an electromagnetic valve assembled using the above-described body for a valve.

FIG. 3 and FIG. 4 show a constitution of a pilot type electromagnetic valve of a single solenoid type where a body for a valve 10 manufactured according to the above process is used.

In this electromagnetic valve, end members 81, 82 are mounted to both ends of the body for a valve 10. At this time, projection portions 81a for positioning of the end member 81 are fitted into the recessed portions 19 positioned on end faces of the both body portion pieces 10a, 10b. The end member 81 is provided therein with a cylinder portion 83 for accommodating a piston 84 pushing a valve member 71, and the piston 84 is arranged so as to drive the valve member 71 by pilot fluid supplied to/discharged from the cylinder portion 83 by driving of a pilot valve 90 with three ports. The pilot valve 90 switches the flow path of the pilot fluid supplied from the supply flow path 12p via a flow path positioned in the end member 81 by driving of a solenoid 90a to perform supplying/discharging of the pilot fluid to/from the cylinder portion 83. Also, the other end member 82 is provided with a cylinder portion 85 for accommodating a piston 86 having a pressure acting area of about ½ of that of the piston 84, and the piston 86 is arranged so as to always push the valve member 71 for return by the pilot fluid supplied from the supply flow path 12p via the pilot flow path 21 and a flow path positioned in the end member 82.

The above-described body for a valve 10 is mounted to the manifold base 70 using the insertion holes 17 for a bolt provided in the body portion pieces 10a, 10b, and the supply port P, the output ports A, B, the pair of discharge ports R are respectively connected to flow paths 70p, 70a, 70b, 70r in the manifold base 70.

Incidentally, the constitution of the electromagnetic valve explained here shows one example of a utilization aspect of the body for a valve 10, and the constitution of the body for a valve 10 of the present invention should not be limited by the example.

In the above-described body for a valve 10, when these splitting faces 13 are joined by a frictional soldering or a ultrasonic wave soldering, it is finally necessary to perform mutual positioning between the both body portion pieces 10a, 10b accurately. From FIG. 5 to FIG. 8 show guide configuration examples for the above-described positioning. Incidentally, in these examples, guides are formed by modifying portions of the above-described embodiment, and, regarding the other constitution and operation, there is not any difference between the examples and the first embodiment.

Explanation will be made regarding FIG. 5 to FIG. 8. First, in a modified embodiment shown in FIG. 5, protrusion portions for guide 31b are provided on corner portions of one body portion piece 30b, while recessed portions for guide 31a are provided in the other body portion piece 30a at corresponding positions thereof. In a modified embodiment shown in FIG. 6, protrusion portions for guide 33b are provided on one body portion piece 32b at positions opposed to each other via a valve hole, while recessed portion for guide 33a are provided in the other body portion piece 32a at corresponding positions thereof. In a modified embodiment shown in FIG. 7, protrusion portions 35b for guide are provided on one body portion piece 34b along sides thereof opposing each other via a valve hole, while recessed portion for guide 35a are provided in the other body portion piece 34a at corresponding positions thereof.

Incidentally, the respective protrusions and recessed portions may have sizes where they are mutually fitted to each other closely. However, in view of mutual friction of the body portion pieces and the like, such a constitution can be employed that the recessed portion is formed so as to be larger than the protrusion portion and a state where the protrusion portion has abutted on one end of the recessed portion is determined to be a proper joining position.

In FIG. 8, pin-like attachable/detachable protrusion portions for guide 37b are provided on corner portions of one body portion piece 36b as guides, while recessed portions for guide (not shown) in which the pin-like protrusion portions for guide are fitted are provided in the other body portion piece 36a at corresponding positions thereof. The attachable/detachable protrusion portion for guide 37b is advantageous in that, in case that the grinding is performed for increasing the degree of flatness of the splitting face 38 and so on, the protrusion portion can be detached temporarily for grinding the splitting face 38. Incidentally, as the protrusion portion for guide 37b, it is desirable to use a spring pin obtained by winding a resilient metal plate in a cylindrical shape.

FIG. 9 and FIG. 10 show a second embodiment (a direct piping type) of a body for a valve according to the present invention. The body for a valve 40 is constituted by mutually joining tow body portion pieces 40a, 40b split on splitting faces 41 and molded to each other like the first embodiment, but the second embodiment is different from the first embodiment in that an output ports A and B are provided in the upper body portion piece 40a but these ports are not provided in the lower body portion piece 40b.

Incidentally, since there is not any difference between the present invention and the first embodiment regarding the other points, main portions of the present embodiment are attached with the same reference numerals as those in the first embodiment, and explanation thereof will be omitted. Also, the present embodiment is not different from the first embodiment in that guides for joining as shown in FIG. 5 to FIG. 8 can be provided.

FIG. 11 and FIG. 12 show a third embodiment of a body for a valve according to the present invention, and a body for a valve 45 is constituted even in the third embodiment such that it is split into two body portion pieces and the portion pieces are joined to each other. However, splitting faces 46 of the body for the valve 45 are set so as to extend along directions of flow paths 47p, 47a, 47b, 47r communicating towards a valve hole 48 from respective ports P, A, B, R opened to an outer face of the body 45. Also, the body portion pieces 45a, 45b split at the splitting faces 46 are provided on their splitting faces 46 with half holes 48a, 48b constituting the valve hole 48, and they are provided on inner faces of the half holes with expansion flow path portions, seat portions coming in contact with seal members 72, riding portions of the seal members 72 on the seat portions and the like in the same manner as the first embodiment. They are different from those of the first embodiment only in orientation of the splitting faces 46, and the present embodiment is not substantially different from the first embodiment. Further, half holes 49 of pilot flow paths and communication paths 49a causing one pilot flow path to communicate with the supply flow path 47p side are provided on the splitting faces 46 of the body portion pieces 45a, 45b. Incidentally, the splitting face 46 side of the body portion piece 45b is not shown, but it has a shape substantially symmetrical to that of the body portion piece 45a.

A process for soldering the body portion pieces 45a, 45b at their splitting faces 46 in the third embodiment is also the same as explained in the first embodiment.

Figure 14:
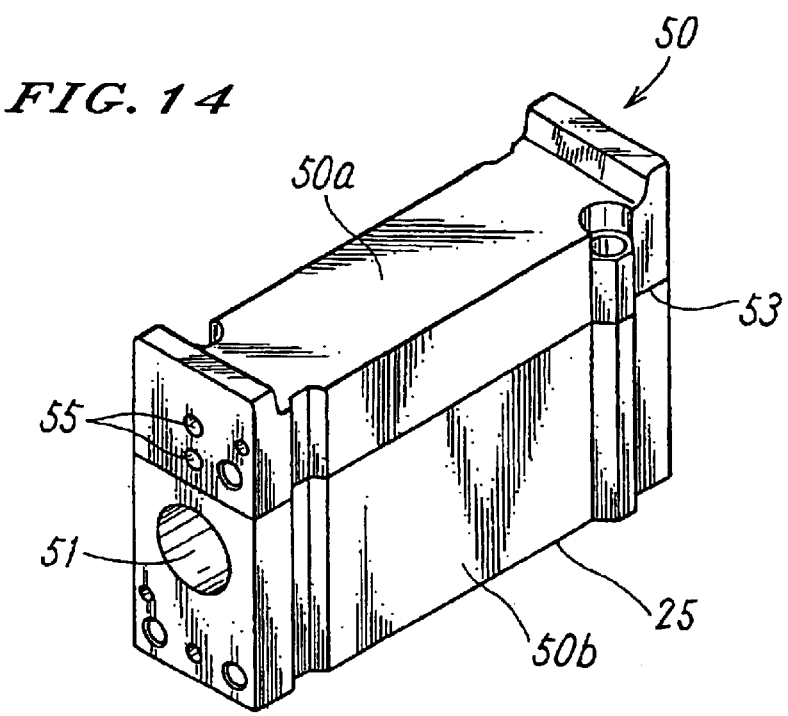
FIG. 14 is an appearance perspective view showing a joined state of a pair of body portion pieces in the fourth embodiment.
Figure 13:
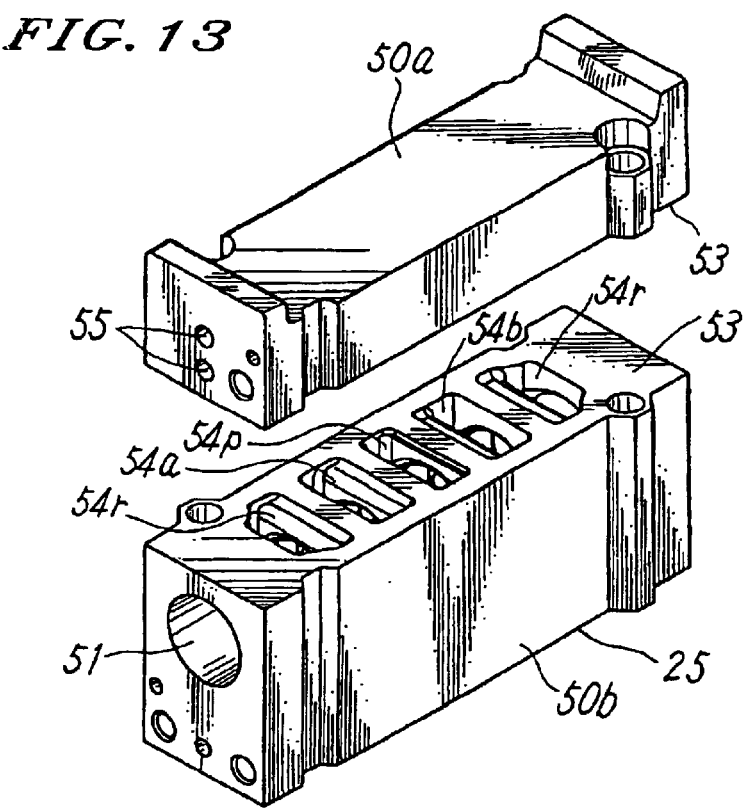
FIG. 13 is an exploded perspective view of a fourth embodiment of a body for a valve according to the present invention.

From FIG. 13 to FIG. 15 show a fourth embodiment of a body for a valve according to the present invention.

In this fourth embodiment, a body for a valve 50 is formed by splitting the body 50 at a position opposed to a body outer face to which respective ports P, A, B, R are opened via a valve hole 51 on splitting faces 53 formed in parallel with the body outer face and mutually joining body portion pieces 50a, 50b which have been respectively molded individually.

In this fourth embodiment, since the splitting is not performed at splitting faces including an axial line of the valve hole of the body, as different from the first to third embodiments, it is necessary to provide the valve hole 51 in the body portion piece 50b from an end face side thereof in an opening manner. As clearly shown in FIG. 15, since holes for molding 54p, 54a, 54b, 54r are bored in the body portion piece 50b at positions opposed to flow paths 52p, 52a, 52b, 52r communicating with the ports P, A, B, R from the above-described splitting face 53 side and recesses in the valve hole 51 are formed from the flow path side and the hole for molding side, grinding work in the valve hole 51 and the like can largely be reduced by means for shifting a main forming positions to both sides in a diametric direction of the valve hole 51, so that it becomes possible to facilitate forming, grinding and like in the valve hole 51.

Incidentally, since such a constitution is merely employed that pilot flow paths 55 are opened in the body portion piece 50a and a communication path (refer to a communication path 62c in FIG. 17) causing a hole 54p for molding to communicate with the pilot flow paths 55 and the like are provided on the splitting face 53, molding of the body portion piece can easily be performed, and the pilot flow paths and the communication path can be formed by machining.

Also, a process for soldering the body portion pieces 50a, 50b on their splitting faces 53 in the fourth embodiment and a utilization aspect of the joined body for a valve are similar to those explained in the first embodiment.

Figure 16:
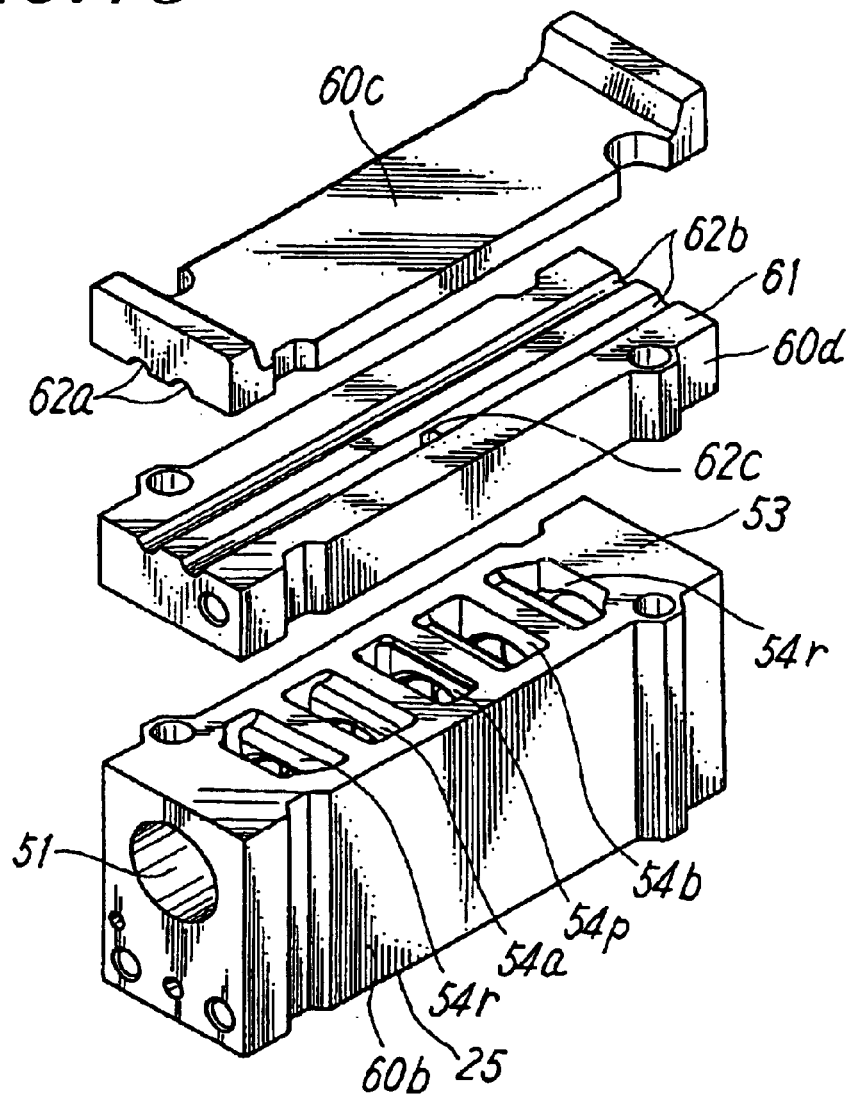
FIG. 16 is an exploded perspective view showing a modified embodiment of the above-described fourth embodiment.

FIG. 16 and FIG. 17 show a modified embodiment of the fourth embodiment shown in FIG. 13 to FIG. 15. In this modified embodiment, an upper body portion piece corresponding to the body portion piece 50a in the fourth embodiment is formed by joining two body portion pieces 60c, 60d. Also, in joining the two body portion pieces 60c, 60d, axial lines of a plurality of pilot flow paths are positioned in second splitting faces 61 such that the axial lines of the pilot flow paths appear in the second splitting faces 61, and these pilot flow paths are formed by joining half holes 62a, 62b. Also, the half hole 62a of one pilot flow path is caused to communicate with a hole for molding 54p via a communication path 62c opened to the splitting face 53. Joining of the two body portion pieces 60c, 60d may be performed like the joining of the body portion pieces 10a, 10b in the joining faces 13 in the first embodiment. Also, since the other body portion piece 60b in this embodiment corresponds to the body portion piece 50b in the fourth embodiment and it has substantially the same constitution as the body portion pieces 50b, main portions thereof are attached with the same reference numerals as those in the fourth embodiment and explanation thereof will be omitted.

Incidentally, besides the embodiments of FIG. 16 and FIG. 17, the body for a valve in each embodiment can, of course, be constituted by splitting the body at a proper portion as needs and joining the split portion pieces in order to facilitate molding of body portion pieces.

Also, in each embodiment, when the body portion pieces are molded, lightening of an unnecessary portion is performed on the splitting face, so that the material of the body portion piece can be saved.

According to the body for a valve and the method for manufacturing the same of the present invention described in detail, working/grinding or the like on the valve hole in the body for a valve, particularly working on recesses in the valve hole is made simplified and facilitated, so that a manufacturing cost of the body for a valve can be reduced. Also, by simplifying the shape of the body for a valve, the number of moldings effected by a single mold at a time of a die cast molding is increased and productivity is also enhanced at this point, so that a manufacturing cost of a body for a valve can be reduced.

What is claimed is:

1. A valve comprising a body having a valve hole, a valve member slidably inserted in the valve hole, a flat mounting face for mounting on a manifold base, and a plurality of ports, wherein the body is split into top and bottom body portion pieces at a splitting face which is parallel to the mounting face, the body portion pieces are joined to each other at the splitting face by solders or adhesives, the body portion pieces have bolt insertion holes which are interconnected in places when two body portion pieces are joined, whereby bolts inserted into the insertion holes are screwed on the manifold base, the two body portion pieces are fixed on the manifold base by the bolts, whereby the bolts are not used exclusively for connecting the two body portion pieces together, and wherein in the sides of the body portion pieces, a first protrusion portion and a first recessed portion are formed at positions which are adjacent to one end of the body in an axial direction, a second recessed portion and a second protrusion portion are formed at positions which are adjacent to another end of the body in the axial direction, and each of the first protrusion portion and the second protrusion has the bolt insertion hole formed therein.

2. A valve according to claim 1, wherein the splitting face is a face including an axial line of the valve hole.

3. A valve according to claim 1, wherein the splitting face is at a position opposed to the mounting face of the body across the valve hole.

4. A valve according to claim 1, wherein a protrusion portion and a recessed portion are formed in the splitting face of the body portion pieces for determining a position to join each other.

5. A valve according to claim 2, wherein a protrusion portion and a recessed portion are formed in the splitting face of the body portion pieces for determining a position to join each other.

6. A valve according to claim 3, wherein a protrusion portion and a recessed portion are formed in the splitting face of the body portion pieces for determining a position to join each other.

7. A valve according to claim 1, wherein the valve has an end member mounted the ends of the valve body in axial direction and containing pistons for driving the valve member and a pilot valve supplying a pilot fluid to the respective piston, the end member is mounted on the body portion pieces so as to mount across the body portion pieces, a protrusion portion for determining position formed in one end member puts into a recessed portion of an end face of the body portion pieces.

8. A valve according to claim 2, wherein the valve has an end member mounted the ends of the valve body in axial direction and containing pistons for driving the valve member and a pilot valve supplying a pilot fluid to the respective piston, the end member is mounted on the body portion pieces so as to mount across the body portion pieces, a protrusion portion for determining position formed in one end member puts into a recessed portion of an end face of the body portion pieces.

9. A valve according to claim 3, wherein the valve has an end member mounted the ends of the valve body in axial direction and containing pistons for driving the valve member and a pilot valve supplying a pilot fluid to the respective piston, the end member is mounted on the body portion pieces so as to mount across the body portion pieces, a protrusion portion for determining position formed in one end member puts into a recessed portion of an end face of the body portion pieces.

10. A valve according to claim 4, wherein the valve has an end member mounted the ends of the valve body in axial direction and containing pistons for driving the valve member and a pilot valve supplying a pilot fluid to the respective piston, the end member is mounted on the body portion pieces so as to mount across the body portion pieces, a protrusion portion for determining position formed in one end member puts into a recessed portion of an end face of the body portion pieces.

11. A valve according to claim 5, wherein the valve has an end member mounted the ends of the valve body in axial direction and containing pistons for driving the valve member and a pilot valve supplying a pilot fluid to the respective piston, the end member is mounted on the body portion pieces so as to mount across the body portion pieces, a protrusion portion for determining position formed in one end member puts into a recessed portion of an end face of the body portion pieces.

12. A valve according to claim 6, wherein the valve has an end member mounted the ends of the valve body in axial direction and containing pistons for driving the valve member and a pilot valve supplying a pilot fluid to the respective piston, the end member is mounted on the body portion pieces so as to mount across the body portion pieces, a protrusion portion for determining position formed in one end member puts into a recessed portion of an end face of the body portion pieces.

* * * * *